June 16, 1964 A. CHIAPUZIO, JR 3,137,789

DIGITAL COMPARATOR

Filed Nov. 16, 1960

INVENTOR.
ANTON CHIAPUZIO JR.

BY John A Duffy

AGENT

United States Patent Office 3,137,789

Patented June 16, 1964

3,137,789

DIGITAL COMPARATOR

Anton Chiapuzio, Jr., Downey, Calif., assignor to North American Aviation, Inc.

Filed Nov. 16, 1960, Ser. No. 69,604

6 Claims. (Cl. 235—177)

This invention relates to a comparison system for determining the sense of the difference between two numbers and more particularly to a binary parallel digital comparator.

Data processing systems such as digital computers and testing devices often present information in the form of a parallel array of binary coded events. This information is used in comparison systems to determine which of two numbers is greater. In an automatic checkout system, for example, having digital operations for handling binary numbers, a signal may be received from a device which has a particular value and it is desired to determine digit-by-digit whether the value received from the system under test is less than an established predetermined desired value. Since precision testing devices utilizing digital operations require numerous stages for comparing the numbers digit-by-digit, it is desirous of obtaining an accurate, reliable, fast, but simple circuit to compare the digits stage-by-stage.

Present systems for comparing two binary digital numbers in parallel are unreliable primarily because of the complicated circuitry necessary. Although each stage may have a relatively few number of components, when multiplied over several stages which are required, the end result is complicated and unreliable circuitry having a large number of components. The excessive number of components results in severe limitations in speed of response and other disadvantages including poor reliability. Accordingly, it is an object of this invention to provide an improved parallel binary digital comparator.

The device of this invention, according to one aspect therein, provides a simple, efficient, and fast response means for comparing two binary digital numbers utilizing a minimum of reliable components for each comparison stage. A pair of numbers coded in a binary digital form may be fed in parallel through a plurality of stages corresponding to the number of digits in the binary numbers and are compared order-by-order and simultaneously to determine which of the numbers is larger.

It is therefore another object of this invention to provide a circuit for simultaneously determining which of the pair of digital numbers is the larger.

It is a further object of this invention to provide an improved parallel binary digital comparator utilizing a minimum of components.

Figure 1:
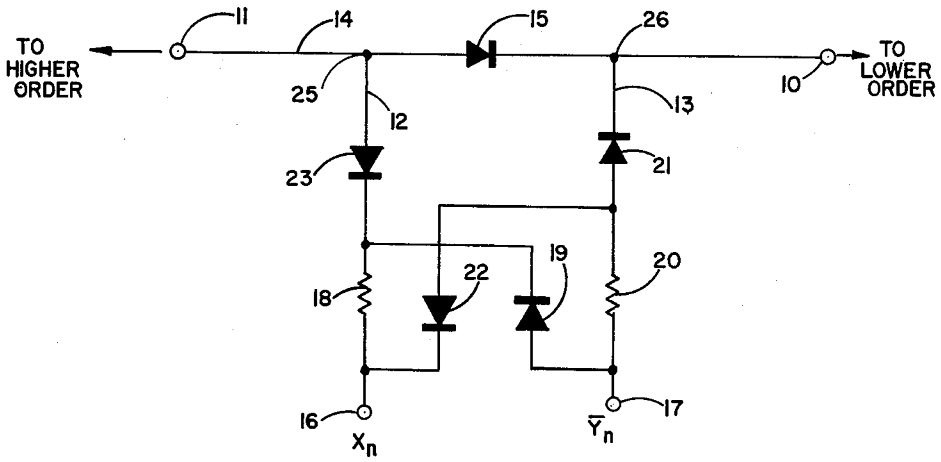
Figure 2:
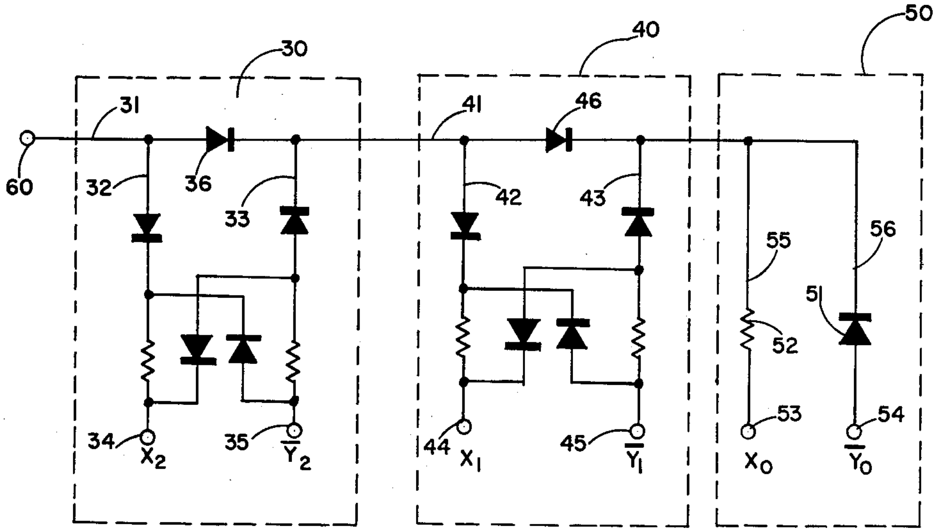

Other objects of invention will become apparent from the following description taken in conjunction with the accompanying drawings in which:

FIG. 1 is a schematic diagram illustrating the circuitry of a typical stage for comparing one order of two binary numbers; and FIG. 2 is a schematic diagram illustrating the comparison of a pair of binary numbers having more than one order.

According to one aspect of the invention, it is desired to determine which of a pair of numbers of the same radix is the larger. Assuming binary numbers, for example, when a digit of one binary number is equal to one and the corresponding digit of another binary number is equal to zero, then it may be said that for the order or stage being compared the digit of the one binary number is larger than the digit of the other. For purposes of explanation, it may be said that in the above case a comparison of a binary one of a predetermined established number with a binary zero of a number to be tested, yields a signal indicative of the true sense of the difference between the digits. Similarly, when a digit of the established number is equal to binary zero and the corresponding digit of the tested number is equal to binary one, a comparison of the two digits will yield a signal indicative of the false sense of the difference of the digits. Thus, the device of this invention may be applied to automatic test equipment wherein one number represents the maximum limit in a binary digital form and the other number represents the value of the system tested. Now if the first number is greater than the second number, the value has not exceeded the maximum limit and a true sense output is presented. Conversely, if the second number is larger than the first number, then the maximum limit has been exceeded and a signal indicative of a false sense is provided. It is to be realized of course, that the designations true sense and false sense are for purposes of explanation only, and other terms may readily be selected.

In the device of the invention as illustrated in the embodiments of FIGS. 1 and 2, comparison between a pair of binary digital numbers is made in parallel form stage-by-stage. Each of the stages includes a carry generate line, a carry suppress line, and a carry propagate line. Assuming for explanation purposes that X is the first or predetermined constant value and that Y is the second or tested value, a true sense signal is produced in the carry generate line in a typical stage when X is greater than Y. A false sense signal is produced in the carry suppress line in a typical stage when Y is greater than X. A true sense signal is produced in the carry propagate line at the output of a typical stage upon either of two conditions:

(1) When X is greater than Y, ($X=1$ and $\overline{Y}=1$), or (2*a*) When X is equal to Y, ($X=1$ and $\overline{Y}=0$, or $X=0$ and $\overline{Y}=1$), and (2*b*) A carry signal is received by the input of the typical stage from the next lower order stage.

In a manner to be more fully described, the carry generate line, the carry suppress line, and the carry propagate line combine in each stage to produce a true sense signal output at the stage when X is greater than Y for that stage or a carry signal is received from a lower stage.

In the schematic diagrams of FIGS. 1 and 2, binary numbers denoted by X and Y are compared for illustrative purposes. Also the circuitry is designed so that a comparatively negative potential is indicative of a true sense signal and a comparatively positive potential is indicative of a false sense or suppress signal.

Referring now to FIG. 1, a schematic diagram of a typical stage of one aspect of the binary comparator of the invention, an input terminal 10 is connected to receive the output of the next successive stage of lower order and the output terminal 11 is connected to present the output of the stage of FIG. 1 to the stage of the next higher order. A carry generate line 12, having two branches is responsive to a digit $X_n$ of the first number X at the terminal 16 and the complement $\overline{Y}_n$ of the digit of the second number Y at the terminal 17. It is to be noted that no circuit for generating the complement of the digit $Y_n$ is shown, since such circuits are well known in the art and not a part of this invention. In the first branch of the carry generate line 12, there is included a diode 23 and a resistor 18 series connected to receive the digit $X_n$ from the terminal 16. In the second branch, there is included a diode 19 connected between the cathode of the diode 23 and the terminal 17. The carry generate line 12 is connected at the anode of the diode 23 to a carry propagate line 14 and presents a true sense signal thereon when the digit $X_n$ is 1 and digit $Y_n$ is 0. Thus, for example, assuming that $X_n$ equals the binary 1 and a negative potential is applied to terminal 16 indicative thereof, and assuming that $\overline{Y}_n$ is equal to one ($Y_n=0$), and a negative potential is applied to terminal 17 indicative thereof, then the negative potential at the terminal 16 is presented to the carry propagate line 14 from the carry generate line 12 at the point 25. The negative potential at the terminal 17 is blocked by the diode 19. In this manner, a true sense signal indicated by a negative potential on the carry propagate line 14 at point 25 is presented when the digit $X_n$ is larger than the digit $Y_n$.

A carry suppress line 13, also having two branches, has one branch including a diode 21 and a resistor 20 series connected between the terminal 17 and the point 26 in common with the lower order terminal 10. The second branch includes a diode 22 having its anode connected to the anode of the diode 21 and its cathode connected to the terminal 16. A carry suppress signal is produced at point 26 in common to the carry suppress line 13 and the lower order terminal 10 when the digit $Y_n$ is greater than the digit $X_n$ with $\overline{Y}_n$ equal to zero and $X_n$ equal to zero. Thus, when $X_n$ equals zero, the terminal 16 presents a positive potential which is blocked by the diode 22 and the terminal 17 presents a positive potential which passes through the diode 21 to provide a false sense or suppress signal indicated by a positive potential at point 26. The positive potential at point 26 blocks or suppresses all signals from any lower orders appearing at the terminal 10, and is prevented from reaching the carry propagate line 14 by a diode 15 which has its anode connected to point 25 and its cathode connected to point 26, thereby presenting signals of positive potential from passing through the stage.

In operation, assuming that the digit $X_n$ is equal to binary 1 and the digit $Y_n$ is equal to binary zero, the carry generate line 12 produces a negative potential at the point 25 indicative of the true sense of the difference between the digits. The carry suppress line 13 is prevented by diode 21 from passing either the negative signal from input terminal 16 or the negative signal from input terminal 17.

Now assuming in FIG. 1 that the digit $X_n$ is equal to or less than the digit $Y_n$, as when $X_n$ is equal to binary 1 and $Y_n$ is equal to binary 1 then the terminal 17 has a positive voltage thereon and the terminal 16 has a negative voltage thereon. The positive voltage at the terminal 17 is prevented by the diode 23 from reaching the point 25, and the negative potential on the terminal 16 is prevented by the diode 19 from reaching the diode 23. As a result, no carry generate signal is produced. Since the numbers are equal, no carry suppress signal is produced either, because the diode 21 blocks the negative signal from the terminal 16 and the diode 22 blocks the positive signal from the terminal 17. Thus, it may be seen in the typical stage of FIG. 1, an output is received on the carry propagate line 14 when the digit $X_n$ is greater than the digit $Y_n$. Additionally, since no carry suppress signal is generated when either $X_n$ is greater than $Y_n$ or when $X_n$ is equal to $Y_n$, a true sense signal received at the terminal 10 from a lower order indicated by a minus potential will pass through the diode 15 to the carry propagate line 14.

From principles of mathematics, it can readily be shown that in comparing two numbers in binary form, for example, it is only necessary to determine if the digit of one number is greater than the digit of the other number in a more significant order than the converse in order to determine that the entire first number is larger than the entire second number. For example, assume that a first binary number X is equal to 100, and a second number Y is equal to 011. By determining in the most significant stage, wherein the digit of X is one and the digit of Y is zero, that X is greater than zero, is sufficient in order to determine that the entire number X is larger than the number Y. Thus, in the circuit of FIG. 1, it is apparent that the occurrence of a true sense signal at the carry generate line 12 produces a true sense signal at the carry propagate line 14 which indicates that $X_n$ is larger than $Y_n$. Therefore, if the typical stage shown in FIG. 1 is of the highest order, then it is immaterial whether or not any true sense signals are received from lower order stages at the terminal 10. Additionally, all positive signals indicataive of a false sense are prevented by the diode 15 from passing to the carry propagate line 14.

In the typical stage as shown in FIG. 1, the diodes are poled for operation wherein a comparatively negative voltage at the terminal 16, for example, is indicative of the binary 1 and a comparative positive voltage at the terminal 17, for example, is indicative of a binary zero or false sense. A true sense signal at the point 25, for example, is a negative potential indicative of a true sense signal and a carry suppress signal at the terminal 26 is a positive potential. It is to be realized that with the reversal of all the diodes shown in FIG. 1, binary one could be represented by a positive potential and binary zero could be represented by a negative potential. Also the ratio of the resistance of resistor 18 to resistor 20 will depend primarily upon the number of stages required and the input and output impedances. In general, the value of resistor 18 is considerably higher than the value of resistor 20.

The circuit of FIG. 1 utilizes five diodes and two resistors for each stage which is a vast improvement over the prior art which typically utilizes many more diodes and resistors along with transistors and the like for each stage.

Turning now to FIG. 2, there is shown a circuit for comparing a pair of binary numbers having more than one order, for example three. In FIG. 2, a highest order stage 30 includes a carry propagate line 31, a carry generate line 32, and a carry suppress line 33 with associated diode and resistor circuitry identical to that for the typical stage shown in FIG. 1. The stage 30 is responsive to the digit $X_2$ at the terminal 34 and the digit representing $\overline{Y}_2$ at the terminal 35. Stage 30 is the highest stage of the three-stage comparator of FIG. 2. Similarly, in FIG. 2, the stage 40 has a carry propagate line 41, a carry generate line 42, and a carry suppress line 43 responsive to digits representing $X_1$ and $\overline{Y}_1$ at input terminals 44 and 45. The least significant stage 50 of the comparator of FIG. 2, includes only a single diode 51 and a resistor 52 having one end connected in common with the anode of diode 51 and the other end connected to the terminal 53. Terminal 53 is responsive to the least significant digit $X_0$. Terminal 54, responsive to the least significant $\overline{Y}_0$, is connected to the anode of the diode 51. The least significant stage 50 includes only a carry generate line 55 which is connected in common to a carry propagate line 56, since a carry suppress line is not necessary in the least significant stage. The carry propagate line 31 of the highest significant stage 30 is connected to the output terminal 60 which is the output of the comparator presenting a negative potential signal when the entire binary number X is greater than the binary number Y. A diode 36 in the stage 30, corresponding to diode 15 of the typical stage in FIG. 1, has its anode connected through the propagate line 31 to the output terminal 60 and its cathode connected in common with the carry suppress line 33 to the carry propagate line 41 of the stage 40 and the anode of the diode 46 of the stage 40. Similarly, the cathode of the diode 46 is connected in common with the carry suppress line 43 and the carry propagate line 56 of the least significant stage 50.

In operation of the three-stage parallel binary comparator of FIG. 2, the digits $X_0$, $X_1$, and $X_2$, in successive stages may be fed in parallel to the terminals 53, 44, and 34 of the stages 50, 40, and 30, respectively, in a manner well known in the art. Also, at the same time, the digits $\overline{Y}_0$, $\overline{Y}_1$, and $\overline{Y}_2$, are fed to the terminals 54, 45, and 35, of the successive stages 50, 40, and 30, respectively. The output terminal 60 produces a negative potential or true sense signal indicating that the number X is larger than the Y or produces no signal indicating that X is equal to or less than Y.

For illustrative purposes, assume for example in FIG. 2, that a binary number X representing a maximum desired value is equal to 101 and a binary number Y representing a tested value is equal to 010. Upon inspection, it can readily be determined that the number X, equal to the decimal 5, is larger than the number Y equal to the decimal 3. Therefore X is larger than Y and there should be presented at the output terminal 60 of the circuit in FIG. 2 a true sense signal of negative potential indicating such. The circuit in FIG. 2 determines this result in the following manner: Simultaneously, the stage 30 compares the digits $1(X_2)$ and $0(Y_2)$, the stage 40 compares the digits $0(X_1)$ and $1(Y_1)$, and the stage 50 compares the digits $1(X_0)$ and $0(Y_0)$. In the stage 50, for example, the input terminal 53 receives a negative potential signal indicating that $X_0$ is binary 1. The input terminal 54 receives a negative signal indicating that the digit $Y_0$ is equal to 0 and that the digit $\overline{Y}_0$ is equal to binary 1. The terminal 53 being negative, the least significant stage 50 generates a true sense signal in the carry generate line 55 which appears on the carry propagate line 56. Simultaneously, in the stage 40, the input terminal 44 receives a positive signal indicating that $X_1$ is binary 0 and the input terminal 45 receives a positive signal indicating that the $Y_1$ is equal to 1 and $\overline{Y}_1$ is equal to 0. Input terminal 44 being positive, no signal is generated on the carry generate line 42. Input terminal 45 being positive, a positive suppress signal is generated on the carry suppress line 43. This positive signal prevents the negative or true sense signal from the carry propagate line 56 of the lower stage 50 from reaching the diode 46. Thus, the fact that in the number Y, the digit 1 of the second stage is greater than the digit 0 of the second stage of the number X, even though the least significant stage of the number X is larger than the least significant stage of the number Y, is verified at the stage 40 by a true sense signal on the carry propagate line. Continuing in the stage 30, the terminal 34 receives a negative signal indicating that $X_2$ is equal to 1 and the terminal 35 receives a negative signal indicating that $Y_2$ is 0 and $\overline{Y}_2$ is 1. The carry generate line 32 receives a true sense signal from the terminal 34 and presents a true sense signal to the carry propagate line 31. Since terminal 35 is negative, no carry suppress signal is generated on the carry suppress line 33. Thus, the true sense signal generated by carry generate line 32 is fed through the carry propagate line 31 to the output terminal 60 which presents a true sense signal indicative of the fact that the number X is larger than the number Y.

Thus, it can be seen that from the combined operation of the stages 30, 40, and 50, it has been determined by reason of the true sense signal at the output terminal 60 that the number X is larger than the number Y. Therefore, the circuit in FIG. 2 performs in the manner desired, namely, that a true sense signal indicating that the order being examined is larger in X than in B originating in a more significant order than a false sense signal results in a true sense output signal.

The circuit in FIG. 2 having stages as described in FIG. 1, operates in a fast and efficient manner with the only limitations on speed being the speed with which the diodes may be switched. Since all information is handled at parallel, the speed of operation of a number of cascade orders connected to the output terminal 60 of FIG. 2 is the same as the single stage shown in FIG. 1. Isolating buffer orders well known in the art may be added as required, both at the output and intermediate points. Several stages could be cascaded without the addition of a buffer order.

The invention as described and illustrated in the embodiments of FIG. 1 and FIG. 2 is particularly advantageous in a large stage comparison circuit having binary numbers containing a large number of digits.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In a digital comparator having a plurality of stages responsive in parallel to corresponding orders of two numbers having the same radix the combination of, a carry generate line for generating a carry signal indicating that the digit of said first number is larger than the corresponding digit of said other number, said carry generate line including a first branch having a first diode and a resistor series connected to receive the digit of said first number, said diode being poled in a direction to pass signals indicative of a true sense of the digit of said first number, and a second branch having a second diode connected between one electrode of said first diode and a terminal for receiving the complement of the corresponding digit of said second number, said second diode oppositely poled from said first diode to pass signals indicative of a false sense of the complement of said second digit, a carry suppress line for generating a suppress signal indicating that the digit of said second number is larger than the corresponding digit of said first number, said carry suppress line including a first branch having a first diode and a resistor series connected to receive the complement of the digit of said second number, said first diode being poled in a direction to pass signals indicative of a false sense of the complement of said second digit, and a second branch having a second diode connected between one electrode of said first diode and a terminal for receiving the corresponding digit of said first number, said second diode poled to pass signals indicative of a true sense of the digit of said first number , a carry propagate line including a diode connected between the other electrode of the first diode of said suppress line and the opposite electrode of the first diode of said carry line, the diode of said carry propagate line poled to pass signals indicative of a true sense.

2. In a binary comparator having a plurality of stages responsive and parallel to corresponding orders of two numbers the combination of, in each stage a carry propagate line including a diode having its cathode connected to receive signals from a successive lower order and its anode connected to present signals to a successive higher order, a carry generate line including a second diode and a resistor series connected between the anode of said first diode and a terminal for receiving the digit of one of said numbers, a third diode having its cathode connected to the cathode of said second diode and its anode connected to receive the complement of the digit of a corresponding order of said second number, said carry generate line presenting a signal indicative of the true sense of the difference between the digit of said first number and the digit of said second number, a carry suppress line including a fourth diode having its cathode connected to the cathode of said first diode and, a resistor series connected with the anode of said fourth diode and a terminal for receiving the complement of the digit of said second number, a fifth diode having its anode connected to the anode of said fourth diode and its cathode connected to the terminal for receiving the digit of said first number, said carry suppress line generating a signal at the cathode of said first diode indicative of a false sense of the difference between the digits of said first and second number.

3. In a digital comparator having a plurality of stages responsive in parallel to corresponding orders of two numbers having the same radix, the combination of a carry generate line for generating a carry signal indicating the digit of said first number is larger than the corresponding digit of said other number, said carry generate line including a first branch having a first diode and a resistor series connected to receive the digit of said first number, said first diode being poled in the direction to pass signals indicative of a true sense of said first digit of said first number, and a second branch having a second diode connected between one electrode of said first diode and a terminal for receiving the complement of the corresponding digit of said second number, said second diode oppositely poled from said first diode to pass signals indicative of a false sense of the complement of the digit of said second number, a carry suppress line for generating a suppress signal indicating that the digit of said second number is larger than the corresponding digit of said first number, said carry suppress line including a first branch having a third diode and a resistor series connected to receive the complement of the digit of said second number, said third diode being poled in a direction to pass signals indicative of a false sense of the complement of said second digit, and a second branch having a fourth diode connected between one electrode of said third diode and the terminal for receiving the corresponding digit of said first number, said fourth diode poled to pass signals indicative of a true sense of the digit of said first number.

4. In a binary digit comparator having a plurality of stages responsive and parallel to corresponding orders of first and second binary digital numbers, the combination comprising: a carry generate line for generating a carry signal indicating that the bit of a particular order of said first number is larger than the corresponding bit of said second number; a carry suppress line for generating a carry suppress signal indicating that the bit of a particular order of said second number is larger than the corresponding bit of said first number; a first terminal connected to receive a signal representing the bit of said first number; a second terminal connected to receive a signal representing the complement of the corresponding bit of said second number; a first diode and a first resistor, series-connected between said carry generate line and said first terminal, said first diode being poled in a direction to pass sginals indicative of a true sense of said bit of said first number; said first diode and a second diode being connected between said carry generate line and said second terminal, said second diode being oppositely poled from said first diode to pass signals indicative of a false sense of the complement of the bit of said second number; a third diode and a second resistor series-connected between said carry suppress line and said second terminal, said third diode being poled in a direction to pass signals indicative of a false sense of the complement of the bit of said second number; said third diode and a fourth diode connected between said carry suppress line and said first terminal, said fourth diode being poled to pass signals indicative of a true sense of the bit of said first number.

5. A circuit as recited in claim 4 in which the resistance of said first resistor is very much larger than the resistance of said second resistor.

6. A circuit as recited in claim 4 and further comprising a fifth diode connected between said carry suppress line and said carry generate line, said fifth diode being poled to pass carry signals, in the absence of a carry suppress signal, from said carry suppress line to said carry generate line.

References Cited in the file of this patent

UNITED STATES PATENTS

| | | |
|---|---|---|
| 2,837,732 | Nelson | June 3, 1958 |
| 2,843,837 | Thaler et al. | July 15, 1958 |